US006743743B2

(12) United States Patent
Sato (10) Patent No.: US 6,743,743 B2
(45) Date of Patent: Jun. 1, 2004

(54) OPTICAL GLASS

(75) Inventor: Koichi Sato, Nishitokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/057,953

(22) Filed: Jan. 29, 2002

(65) Prior Publication Data

US 2002/0151424 A1 Oct. 17, 2002

(30) Foreign Application Priority Data

Jan. 29, 2001 (JP) .......................................... 2001-019854

(51) Int. Cl.⁷ .............................. C03C 3/19; C03C 3/16
(52) U.S. Cl. ............................ 501/47; 501/45; 501/46; 501/902; 501/903
(58) Field of Search ........................... 501/45, 46, 47, 501/902, 903

(56) References Cited

U.S. PATENT DOCUMENTS

| 3,836,375 | A | * | 9/1974 | Broemer et al. ............... 501/46 |
| 4,115,131 | A | * | 9/1978 | Ishibashi et al. .............. 501/42 |
| 4,439,530 | A | * | 3/1984 | Tajima ......................... 501/45 |

FOREIGN PATENT DOCUMENTS

| JP | 07-247136 | * | 9/1995 |
| JP | 10-158029 | * | 6/1998 |

OTHER PUBLICATIONS

Derwent Abstract 1995–363453 of JP 07–247,136.*
Derwent Abstract 1983–736,133 of US 4,439,530.*
Derwent Abstract 1998–393279 of JP 10–158,029.*
Machine translation of JP 07–247,136.*
Machine translation of JP 10–158,029.*
Patent Abstracts of Japan, JP 10–158029, Jun. 16, 1998.
Patent Abstracts of Japan, JP 08–157231, Jun. 18, 1996.
Patent Abstracts of Japan, JP 07–247136, Sep. 26, 1995.

* cited by examiner

Primary Examiner—David Sample
Assistant Examiner—Elizabeth A. Bolden
(74) Attorney, Agent, or Firm—Oblon, Spivak, McClelland, Maier & Neustadt, P.C.

(57) ABSTRACT

Optical glasses and optical articles comprised of the optical glass are disclosed. One of which comprises, by means of weight percentages, more than 32 percent and not more than 45 percent $P_2O_5$, more than 0.5 percent and not more than 6 percent $Li_2O$, more than 5 percent and not more than 22 percent $Na_2O$, 6–30 percent $Nb_2O_5$, 0.5–10 percent $B_2O_3$, 0–35 percent $WO_3$, 0–14 percent $K_2O$, and 10–24 percent $Na_2O+K_2O$, and the total of all the above components is not less than 80 percent.

41 Claims, 1 Drawing Sheet

OPTICAL GLASS

BACKGROUND OF THE INVENTION

1. Field of the Invention

The present invention relates to an optical glass that has a medium to high refractive index and high dispersion characteristics, can be pressed at relative low temperature, and has a relatively low sag temperature and liquidus temperature.

2. Description of Related Art

A number of glasses having medium to high refractive indexes and high dispersion characteristics are known.

For example, Japanese Patent Un-examined Publication No. Hei 07-97234 describes a low melting point optical glass having a medium to high refractive index and high dispersion characteristics and comprising prescribed quantities of $P_2O_5$, $Na_2O$, $Nb_2O_5$, and $WO_3$. This optical glass is described as having a refractive index of 1.69–1.83, a dispersion ratio of 21–32, and a sag temperature of not more than 570° C. However, when comparison is conducted between the examples described in Japanese Patent Un-examined Publication No. Hei 07-97234 having a refractive index of not greater than 1.73, those glasses characterized by having a sag temperature Ts exceeding 520° C. are numerous. This is attributed to an $Li_2O$ content of 0–0.5 weight percent. Further, there are also examples (Examples 6, 7, and 8) in which Ts is less than 520° C. even with an $Li_2O$ content within the range of 0–0.5 weight percent. In that case, there is the problem of the use of expensive $GeO_2$ as a glass starting material. When the $GeO_2$ is removed from the glasses of these examples, the liquidus temperature (also referred to hereinafter as "LT") ends up exceeding 900° C. This is attributed to a $P_2O_5$ content of not greater than 32 percent.

Japanese Patent Un-examined Publication No. Hei 05-270853 describes an optical glass having a medium to high refractive index and high dispersion characteristics and comprising prescribed quantities of $SiO_2$, $B_2O_3$, $P_2O_5$, $Nb_2O_5$, and $Na_2O+K_2O$. In the glasses described in this publication, all the glasses described in the examples having a refractive index of 1.64–1.73 have liquidus temperatures exceeding 900° C. This is attributed to a $P_2O_5$ content of not greater than 32 weight percent. Further, these glasses also have a Ts exceeding 520° C. This is attributed to an $Na_2O$ content of not greater than 5 weight percent.

Japanese Patent Un-examined Publication No. Sho 52-132012 describes an optical glass having a medium to high refractive index and high dispersion characteristics and comprising prescribed quantities of $B_2O_3$, $P_2O_5$, and $Nb_2O_5$. The glasses described in the examples of this publication, which have refractive indexes of 1.64–1.73, all have a Ts exceeding 520° C. This is attributed to an $Na_2O$ content not exceeding 5 weight percent. Excluding the glasses described in Examples 2 and 3, the lack of $Li_2O$ is thought to result in a Ts exceeding 520° C. Even in the glasses of Examples 2 and 3 which comprise $Li_2O$ in a quantity exceeding 0.5 weight percent, the Ts exceeds 520° C. and the liquidus temperature exceeds 900° C. This is attributed to a $P_2O_5$ content of not more than 32 weight percent and an $Nb_2O_5$ content exceeding 30 weight percent.

The press-molding of glass is normally conducted within a high temperature range exceeding the sag temperature temperature Ts of the glass by about 20–60° C. When the yield temperature of the glass exceeds 520° C., the press temperature becomes at least 540° C. Thus, the glass has a strong tendency to react with the molding surface of the mold, shortening the service life of the mold and rendering the glass unsuited to mass production.

When the liquidus temperature is high, the glass tends to lose transparency in the vicinity of its softening point, that is, in the vicinity of the molding temperature in press-molding.

Further, the glass preforms employed in reheating presses are required not to have variation in shape and weight. Thus, when forming preforms by shaping molten glass, the shaping is conducted at a prescribed viscosity where there tends not to be variation in shape and weight. Thus, when the glass is at a temperature at which the viscosity is suited to shaping, it must not tend to lose transparency, that is, the liquidus temperature must be lower than the temperature at which viscosity is suited to shaping. From these perspectives, the liquidus temperature is required to be 800–900° C.

However, in the above-described glasses, almost all of those glasses having a refractive index falling within a range of 1.64–1.72 and an Abbé number of 29–36 have a sag temperature temperature exceeding 520° C. and a liquidus temperature exceeding 900° C. In glasses used in press-molding, when the life of the mold and the tendency of the glass to lose transparency are considered, a sag temperature of not greater than 520° C. and a relatively low liquidus temperature, particularly one not greater than 900° C., are desirable.

Accordingly, the object of the present invention is to provide an optical glass having a medium to high refractive index and high dispersion characteristics, the liquidus temperature of which is comparatively low, specifically not greater than 900° C., and more particularly, an optical glass the refractive index of which falls within the range of 1.64–1.72 and the Abbé number of which falls within the range of 29–36.

SUMMARY OF THE INVENTION

The invention relates to an optical glass comprising, by means of weight percentages, more than 32 percent and not more than 45 percent $P_2O_5$, more than 0.5 percent and not more than 6 percent $Li_2O$, more than 5 percent and not more than 22 percent $Na_2O$, 6–30 percent $Nb_2O_5$, 0.5–10 percent $B_2O_3$, 0–35 percent $WO_3$, 0–14 percent $K_2O$, and 10–24 percent $Na_2O+K_2O$, and the total of all the above components is not less than 80 percent.

With the above optical glass, the glass preferably comprises, by means of weight percentages, more than 32 percent and not more than 40 percent $P_2O_5$, 1–4 percent $Li_2O$, 10–19 percent $Na_2O$, 10–28 percent $Nb_2O_5$, 1–5 percent $B_2O_3$, 0–8 percent $K_2O$, and 12–22 percent $Na_2O+K_2O$, and the total of all the above components is not less than 80 percent. With this optical glass, the glass more preferably comprises 12–17 percent $Na_2O$, 15–26 percent $Nb_2O_5$, 0–4 percent $K_2O$, and 14–19 percent $Na_2O+K_2O$.

With the above optical glasses, the glass may further comprise, by means of weight percentages, 0–2 percent $SiO_2$, 0–5 percent $Al_2O_3$, not less than 0 percent but less than 8 percent $TiO_2$, 0–15 percent ZnO, 0–12 percent BaO, 0–18 percent $WO_3$, not less than 0 percent but less than 1 percent $Sb_2O_3$, and 0–1 percent $SnO_2$, and the total of all of the above components and the components listed in any one of claims 1 to 3 is not less than 95 percent. With this optical glass, the glass preferably comprises, by means of weight percentages, 0–3 percent $Al_2O_3$, 0–6 percent $TiO_2$, and 0–9 percent ZnO, where the total of all of the components listed is not less than 95 weight percent; and the glass preferably comprises 0–1 percent $SiO_2$.

With the above optical glasses, the glass may comprise not less than 0 percent but less than 0.5 percent $SiO_2$, 0–5 percent $TiO_2$, 0–5 percent ZnO, and the total of all of the components listed is not less than 98 percent; and the glass may further comprise 3–15 weight percent $WO_3$.

The invention further relates to an optical glass comprised phosphate glass which comprises, by means of weight percentages, more than 0.5 percent and but not more than 6 percent $Li_2O$, more than 5 percent but not more than 22 percent $Na_2O$, 0–14 percent $K_2O$, 10–24 percent $Na_2O+K_2O$, 6–30 percent $Nb_2O_5$, and not more than 45 percent $P_2O_5$, and exhibits a refractive index (nd) of 1.64–1.72, an Abbé number (vd) of 29–36, and a sag temperature (Ts) of not greater than 520° C.; and an optical glass comprised of phosphate glass which comprises, by means of weight percentages, more than 0.5 percent but not more than 6 percent $Li_2O$, more than 5 percent but not more than 22 percent $Na_2O$, 0–14 percent $K_2O$, 10–24 percent $Na_2O+K_2O$, 6–30 percent $Nb_2O_5$, 0–35 percent $WO_3$, 0–5 percent $Al_2O_3$, and not less than 0 percent but less than 8 percent $TiO_2$, and exhibits a refractive index (nd) of 1.64–1.72, an Abbé number (vd) of 29–36, and an sag temperature (Ts) of not greater than 520° C.

With these glasses, the glass preferably comprises more than 32 weight percent but not more than 45 weight percent $P_2O_5$.

The invention still further relates to an optical glass comprising, by means of weight percentages, more than 32 percent but not more than 45 percent $P_2O_5$, more than 0.5 percent but not more than 6 percent $Li_2O$, more than 5 percent but not more than 22 percent $Na_2O$, 6–30 percent $Nb_2O_5$, 0.5–10 percent $B_2O_3$, 0–35 percent $WO_3$, 0–14 percent $K_2O$, 10–24 percent $Na_2O+K_2O$, 0–2 percent $SiO_2$, 0–5 percent $Al_2O_3$, not less than 0 percent but less than 8 percent $TiO_2$, 0–15 percent ZnO, 0–12 percent BaO, not less than 0 percent but less than 1 percent $Sb_2O_3$, and 0–1 percent $SnO_2$, where the total of the contents of each of the above-listed components is not less than 95 percent, the refractive index (nd) is 1.64–1.72, the Abbé number (vd) is 29–36, and the sag temperature (Ts) is not more than 520° C.

The invention further relates to an optical glass comprised of phosphate glass which comprises $Li_2O$, $Na_2O$, $Nb_2O_5$, and $B_2O_3$ as essential components, and not more than 2 weight percent $SiO_2$ an optional component, with a refractive index (nd) of 1.64–1.72, an Abbé number (vd) of 29–36, a sag temperature (Ts) of not more than 520° C., and a liquidus temperature (LT) of not more than 900° C.

With this optical glass, the glass may further comprise, by means of weight percentages, more than 32 percent but not more than 45 percent $P_2O_5$, more than 0.5 percent but not more than 6 percent $Li_2O$, more than 5 percent but not more than 22 percent $Na_2O$, 6–30 percent $Nb_2O_5$, and 0.5–10 percent $B_2O_3$.

With all of the optical glasses mentioned above, the glass may further comprises, by means of weight percentages, 0–5 percent MgO, 0–5 percent CaO, 0–5 percent SrO, 0–3 percent $La_2O_3$, 0–3 percent $Y_2O_3$, 0–3 percent $Gd_2O_3$, 0–3 percent $ZrO_2$, not less than 0 percent but less than 1 percent $AS_2O_3$, 0–3 percent $Ta_2O_5$, 0–3 percent $In_2O_3$, 0–3 percent $TeO_2$, 0–3 percent $Bi_2O_3$, and 0–1 percent $GeO_2$, where the total of the above-listed components and the components described in any one of claims 1 to 14 is not less than 99 percent.

The invention still further relates to an optical article comprised of the optical glass according to the present invention; an optical glass for precision press-molding wherein the glass is one according to the present invention; a glass preform obtained by preforming the above optical glass; a glass optical article obtained by reheat press-molding the above glass preform; and an optical article obtained by press-molding the optical glass according to the present invention.

DETAILED DESCRIPTION OF THE INVENTION

Below, unless expressly stated otherwise, nd denotes the refractive index, vd denotes the Abbé number, Ts denotes the yield temperature, and LT denotes the liquidus temperature.

The glass of the present invention differs from the glass described in Japanese Patent Un-examined Publication No. Hei 07-97234 not only by essentially not comprising or comprising not more than 1 percent expensive $GeO_2$ as a glass starting material, but also by having a Ts of not more than 520° C. and in that the pressing temperature can be lowered. Further, the glass of the present invention has a liquidus temperature of not greater than 900° C., permitting the molding with heat of a preform in the stage prior to press-molding without causing striae, the adhesion of volatile matter, or improper shape.

Further, the glass of the present invention differs from the glass described in Japanese Patent Un-examined Publication No. Hei 05-270853 in that the liquidus temperature is reduced to not more than 900° C. by incorporating a quantity of $P_2O_5$ exceeding 32 percent. Thus, the molding with heat of a preform in the stage prior to press-molding can be conducted without causing striae, the adhesion of volatile matter, or improper shape. Further, since the glass of the present invention incorporates more than 5 weight percent $Na_2O$, the Ts is lower than 520° C., so it is not necessary to raise the pressing temperature of the press machine, affording the advantage of not applying a heat load to the press machine.

Further, the glass of the present invention differs from the glass described in Japanese Patent Un-examined Publication No. Shō 52-132012 by comprising more than 5 weight percent $Na_2O$, more than 0.5 weight percent $Li_2O$, more than 32 weight percent $P_2O_5$, and not more than 30 weight percent of $Nb_2O_5$, yielding a glass for precision press with a Ts of not greater than 520° C. and a liquidus temperature of not greater than 900° C.

In the present Specification, the word "percent" refers to a percentage by weight unless specifically stated otherwise.

Further, oxides are denoted by their representative chemical symbols and include the case where the oxide reduction states of Ti, Nb, W, Sb, Sn, Zr, As, Ta, In, Te, Ge, and the like have been modified. Specifically, the case where Ti is partially reduced to obtain $TiO_{1.9}$ is also covered and denoted as $TiO_2$.

The reasons for limiting each of the components of the glass of the present invention, and more particularly, the glasses described in claims 1–8, will be described below.

$P_2O_5$ is a glass forming component. In the glass of the present invention, to achieve a sag temperature of not greater than 520° C. and good resistance to loss of transparency, phosphate glass is desirable, phosphate glass comprising not more than 45 weight percent $P_2O_5$ is preferred, and phosphate glass comprising not less than 32 weight percent and not more than 45 weight percent $P_2O_5$ is even more preferred. When the content of $P_2O_5$ exceeds 45 weight percent, the targeted refractive index (1.64 or greater) becomes difficult to achieve. Considering nd>1.66 and chemical durability, the $P_2O_5$ content desirably exceeds 32 weight percent but does not exceed 40 weight percent.

$Li_2O$ is a component having the effect of reducing the Ts. When the $Li_2O$ content is not greater than 0.5 weight percent, it is impossible to achieve the targeted characteristic of Ts≦520° C. When the $Li_2O$ content exceeds 6 weight percent, it becomes impossible to achieve the targeted characteristic of a liquidus temperature of not greater than 900° C. When the content of $Li_2O$ is kept within the range of 1–4 weight percent, a glass in which Ts≦510° C. and the liquidus temperature≦860° C. can be achieved, which is desirable for manufacturing.

$Na_2O$ is a component having the effect of lowering the Ts. When the $Na_2O$ content is not greater than 5 weight percent, it becomes impossible to achieve the targeted characteristic of Ts≦520° C. When the $Na_2O$ content exceeds 22 weight percent, chemical durability deteriorates. An $Na_2O$ content within the range of 10–19 weight percent is desirable in that chemical durability is good and a glass in which Ts≦510° C. and the liquidus temperature is not greater than 860° can be achieved. An $Na_2O$ content within the range of 12–17 weight percent is preferred in that chemical durability is good and a glass in which Ts≦510° C. and the liquidus temperature is not greater than 840° C. can be achieved.

$Nb_2O_5$ is a component imparting to glass the characteristics of nd≧1.64 and vd≦36. When the $Nb_2O_5$ content is less than 6 weight percent, the targeted refractive index (nd≧1.64) and the dispersion characteristic (vd≧36) cannot be achieved. When the $Nb_2O_5$ content exceeds 30 weight percent, the liquidus temperature ends up exceeding 900° C. The $Nb_2O_5$ content is preferably 10–28 weight percent. Within this range, nd≧1.66, the liquid phase transition temperature≦860° C., and Ts≦510° C. The $Nb_2O_5$ content is more preferably within the range of 15–26 weight percent. Within this range, a glass in which nd≧1.66 and the liquid phase transition temperature≦840° C. can be achieved.

$B_2O_3$ is a component that complements the glass forming component $P_2O_5$ and lowers the liquidus temperature. When the $B_2O_3$ content is less than 0.5 weight percent, the liquidus temperature ends up exceeding 900° C. When the $B_2O_3$ content exceeds 10 weight percent, the Ts ends up exceeding 520° C. The $B_2O_3$ content is desirably 1–5 weight percent. Within this range, a glass in which Ts≦510° C. and the liquid phase transition temperature≦860° C. can be achieved.

$WO_3$ is an optional component. When added in a suitable quantity of not greater than 35 weight percent, it is possible to readily adjust nd within the range of 1.64–1.72 and vd within the range of 36–29 while maintaining the characteristics of Ts≦520° C. and the liquidus temperature (denoted as "LT" hereinafter) ≦900° C. When the $WO_3$ content exceeds 35 weight percent, coloration intensifies. The $WO_3$ content desirably falls within the range of 0–18 weight percent. Within this range, coloration tends not to occur and it is possible to readily adjust nd within the range of 1.65–1.71 and vd within the range of 35.5–30 while maintaining the characteristics of Ts≦510° C. and LT≦860° C. The $WO_3$ content preferably falls within the range of 3–15 weight percent. Within this range, it is possible to readily adjust nd within the range of 1.66–1.70 and vd within the range of 35–30 while maintaining the characteristics of Ts≦510° C. and LT≦840° C.

$K_2O$ is an optional component. When added in a suitable quantity of not greater than 14 weight percent, it is possible to readily adjust nd within the range of 1.64–1.72 and vd within the range of 36–29 while maintaining the characteristics of Ts≦520° C. and LT≦900° C. When the $K_2O$ content exceeds 14 weight percent, chemical durability deteriorates. The $K_2O$ content desirably falls within the range of 0–8 weight percent. Within this range, chemical durability tends not to deteriorate and it is possible to readily adjust nd within the range of 1.65–1.71 and vd within the range of 35.5–30 while maintaining the characteristics of Ts≦510° C. and LT≦860° C. The $K_2O$ content preferably falls within the range of 0–4 weight percent. Within this range, it is possible to readily adjust nd within the range of 1.66–1.70 and vd within the range of 35–30 while maintaining the characteristics of Ts≦510° C. and LT≦840° C.

$Na_2O+K_2O$ is a component that has the effect of lowering the Ts. When the $Na_2O+K_2O$ content is less than 10 weight percent, it becomes impossible to achieve the targeted characteristic of Ts≦520° C. When the $Na_2O+K_2O$ content exceeds 24 weight percent, chemical durability deteriorates. When the $Na_2O+K_2O$ content falls within the range of 12–22 weight percent, chemical durability is good and a glass in which Ts≦510° C. and the liquidus temperature is not greater than 860° C. is achieved. Particularly, when the $Na_2O+K_2O$ content falls within the range of 14–19 weight percent, chemical durability is good and a glass is achieved in which Ts≦510° C. and the liquidus temperature is not greater than 840° C.

$SiO_2$ is an optional component. When added in a suitable quantity of not greater than 2 weight percent, it is possible to readily adjust nd within the range of 1.65–1.71 and vd within the range of 35.5–30. When the $SiO_2$ content exceeds 2 weight percent, Ts sometimes exceeds 520° C. Further, in consideration of glass coloration, when melting is made with a $SiO_2$ crucible, a quantity of from 0 weight percent to less than 0.5 weight percent $SiO_2$ may mix into the glass. Thus, the quantity of $SiO_2$ is desirably set to from 0 weight percent to less than 0.5 weight percent. In the optical glass described in claim 7, the content of $SiO_2$ is desirably from 0 weight percent to not greater than 0.4 weight percent.

$Al_2O_3$ is an optional component. When added in a suitable quantity of not greater than 5 weight percent, the chemical durability of the glass improves. However, when added in a quantity exceeding 5 weight percent, the melting properties of the glass when melting the glass starting material deteriorate and the melting temperature increases. As a result, when conducting melting in a Pt crucible, the quantity of Pt mixed in increases and problems such as coloration tend to result. When melting is conducted in an Si crucible, the amount of Si mixing in increases and Ts exceeds 520° C. The $Al_2O_3$ content desirably falls within the range of 0–3 weight percent.

$TiO_2$ is an optional component. When added in a suitable quantity of less than 8 weight percent, the chemical durability of the glass improves, nd rises, and vd permits high dispersion. However, when $TiO_2$ is added in a quantity of 8 percent or greater, coloration tends to develop. The $TiO_2$ content is preferably 0–6 weight percent, more preferably falling within the range of 0–5 weight percent. In the optical glass described in claim 7, the $TiO_2$ content is preferably 0–4.9 weight percent.

ZnO is an optional component. When added in a suitable quantity of not greater than 15 weight percent, the chemical durability of the glass increases and Ts is lowered. However, when added in a quantity exceeding 15 weight percent, vd sometimes exceeds 36. The preferred ZnO content is 0–9 weight percent, with 0–5 weight percent being more preferred.

BaO is an optional component. When added in a suitable quantity of not greater than 12 weight percent, nd can be readily adjusted within the range of 1.65–1.71 and vd within the range of 35.5–30. However, the addition of a quantity exceeding 12 weight percent is undesirable because LT exceeds 900° C. The preferred BaO content is 0–6 weight percent.

$Sb_2O_3$ and $As_2O_3$ are optional components. Addition in suitable quantity has the effects of debubbling and clarifying. It also has the effect of inhibiting reduction coloration of $Nb_2O_5$, $TiO_2$, $WO_3$, and the like. However, when $Sb_2O_3$ is added in a quantity of one weight percent or above, the $Sb_2O_3$ itself develops strong coloration. Thus, the suitable range for the addition of $Sb_2O_3$ is from 0 to less than 1 weight percent. Further, when $As_2O_3$ is added in a quantity of 1 weight percent or greater, the $As_2O_3$ itself develops strong coloration. Thus, the suitable range for the addition of $As_2O_3$ is from 0 to less than 1 weight percent.

$SnO_2$ is an optional component. Addition in a suitable quantity of less than 1 weight percent has the effects of debubbling and clarifying. It also has the effect of inhibiting reduction coloration of $Nb_2O_5$, $TiO_2$, $WO_3$, and the like. However, when $SnO_2$ is added in a quantity of one weight percent or above, the $SnO_2$ itself develops strong coloration. Thus, the suitable range for the addition of $SnO_2$ is from 0 to less than 1 weight percent.

MgO, CaO, and SrO are optional components. Their addition in suitable quantities facilitates the adjustment of nd within the range of 1.65–1.71 and vd within the range of 35.5–30. However, their respective addition in quantities exceeding 5 weight percent is undesirable in that LT exceeds 900° C. The respective contents of MgO, CaO, and SrO are desirably 0–3 weight percent.

$La_2O_3$, $Y_2O_3$, $Gd_2O_3$, $ZrO_2$, $Ta_2O_3$, $In_2O_3$, $TeO_2$, and $Bi_2O_3$ are optional components the addition of each of which in suitable quantity facilitates the adjustment of nd within the range of 1.65–1.71 and vd within the range of 35.5–30. However, their respective addition in quantities exceeding 3 weight percent is undesirable in that LT exceeds 900° C. The respective content of each of these components is desirably 0–1 weight percent.

The optical glass of the present invention desirably does not comprise PbO in view of safety. Further, because of the high cost of $GeO_2$, it is desirably either not incorporated or incorporated within a range of 0–1 weight percent.

In the glass described in claims 1 and 2, the total of the components described in each of the claims is not less than 80 percent. This is desirable to achieve the characteristics of a liquidus temperature of not greater than 900° C. and a sag temperature of 520° C. in a refractive index range of 1.64–1.72 and an Abbé number range of 29–36.

Further, in the glass described in claims 4 and 5, the total of components described in each of the claims is not less than 95 percent. This is desirable to provide a glass with a liquidus temperature of not greater than 900° C. and a sag temperature of not greater than 520° C. in a refractive index range of 1.64–1.72 and an Abbé number range of 29–36, as well as a glass having no practical problems with chemical durability and coloration.

Further, the liquidus temperature (LT) of the optical glass of the present invention is normally not greater than 900° C. The quantities of the various components added are desirably adjusted to yield an LT of not greater than 860° C., and more preferably, not greater than 840° C. The sag temperature (Ts) is normally not greater than 520° C. The quantities of the various components added are desirably adjusted to yield a Ts of not greater than 510° C.

The reasons for limiting the content of the various components in the form of $Li_2O$, $Na_2O$, $K_2O$, $Na_2O+K_2O$, and $Nb_2O_5$ of the phosphate glass described in claim 9 are identical to those of above-described claims 1–8. The reason for incorporating not more than 45 percent $P_2O_5$ is identical to that for the glass of claims 1–8. In the phosphate glass described in claim 9, the refractive index is 1.64–1.72, the Abbé number is 29–36, and the sag temperature is not greater than 520° C. Glass having a medium to high refractive index and high dispersion characteristics with the above-stated refractive index and Abbé number is suited to use in optics. From the viewpoint of glass used in press-molding, the sag temperature is not greater than 520° C. in consideration of the service life of the mold and the tendency of the glass to lose transparency. Optical glass having such a refractive index, Abbé number, and sag temperature can be suitably obtained from glass comprising the various components described in claim 9 within the ranges stated in claim 9. It is also desirable to incorporate 0.5–10 weight percent $B_2O_3$ and 0–4.9 weight percent $TiO_2$ into the glass described in claim 9.

The reasons for limiting the content of the various components in the form of $Li_2O$, $Na_2O$, $K_2O$, $Na_2O+K_2O$, $Nb_2O_5$, $WO_3$, $Al_2O_3$, and $TiO_2$ of the phosphate glass described in claim 10 are identical to those of above-described claims 1–8. Further, the refractive index is 1.64–1.72, the Abbé number is 29–36, and the sag temperature is not greater than 520° C. Glass having a medium to high refractive index and high dispersion characteristics with the above-stated refractive index and Abbé number is suited to use in optics. From the viewpoint of glass used in press-molding, the sag temperature is not greater than 520° C. in consideration of the service life of the mold and the tendency of the glass to lose transparency. Optical glass having such a refractive index, Abbé number, and sag temperature can be suitably obtained from glass comprising the various components described in claim 10 within the ranges stated in claim 10.

In the glasses described in claims 9 and 10, the $P_2O_5$ content desirably exceeds 32 percent but does not exceed 45 percent (claim 11). The reason for this is the same as for limiting the content of $P_2O_5$ in the invention described in claim 1.

The reasons for limiting the content of the various components in the form of $P_2O_5$, $Li_2O$, $Na_2O$, $Nb_2O_5$, $B_2O_3$, $WO_3$, $K_2O$, $Na_2O+K_2O$, $SiO_2$, $Al_2O_3$, $TiO_2$, $ZnO$, $BaO$, $WO_3$, $Sb_2O_3$, and $SnO_2$ of the glass described in claim 12 are identical to those of above-described claims 1–8. Further, the refractive index is 1.64–1.72, the Abbé number is 29–36, and the sag temperature is not greater than 520° C. Glass having a medium to high refractive index and high dispersion characteristics with the above-stated refractive index and Abbé number is suited to use in optics. From the viewpoint of glass used in press-molding, the sag temperature is not greater than 520° C. in consideration of the service life of the mold and the tendency of the glass to lose transparency. Optical glass having such a refractive index, Abbé number, and sag temperature can be suitably obtained from glass comprising the various components described in claim 12 within the ranges stated in claim 12. The total quantity of the above-listed components is not less than 95 percent. This is desirable to achieve characteristics of a liquidus temperature of not greater than 900° C. and a sag temperature of not greater than 520° C. within a refractive index range of 1.64–1.72 and an Abbé number range of 29–36.

The reasons for limiting the various components in the glass described in claims 13–18 is identical to the reason for limiting the various components in the optical glass described in claims 1–8.

In the glass described in claims 15–18, the total of the components described in each of the claims is not less than 99 percent. This is desirable to achieve characteristics of a liquidus temperature of not greater than 900° C. and a sag temperature of not greater than 520° C. within a refractive index range of 1.64–1.72 and an Abbé number range of 29–36. In the optical glass described in claims 1–18, the total quantity of $P_2O_5$, $Li_2O$, $Na_2O$, $Nb_2O_5$, $B_2O_3$, $WO_3$, $Al_2O_3$, $TiO_2$, ZnO, and $Sb_2O_3$ is desirably not less than 95 weight percent, preferably not less than 99 weight percent, and more preferably, 100 weight percent.

The optical glass of the present invention can be manufactured by mixing, melting, clarifying, stirring, and homogenizing the starting compounds by the usual methods.

The present invention can also provide materials for precision press-molding comprised of the optical glass of the present invention, optical articles comprised of the optical glass, and optical articles obtained by precision press-molding the materials for precision press-molding.

The material for precision press molded of the present invention is characterized by being comprised of the above-described optical glass of the present invention.

Here, the term precision press-molding is used to mean press-molding in which an optically functioning surface is shaped by press-molding, and the term material for precision press-molding is used to mean a molded glass material used during precision press-molding.

As an example of precision press-molding, first, a glass melt having a viscosity of 0.1–5 dPa·s at 1,000–1,200° C. that has been melted, stirred, clarified and homogenized is flowed out of a flow pipe, received in a mold (generally different from the pressing mold), and a spherical, elliptical, or similarly shaped material for precision press molding called a preform is produced. The preform is then reheated and pressure molded by an upper and lower mold. In this process, in view of the shape of the molded article, a drum mold may be used in combination.

The preform may be formed by mechanically processing a cooled glass or shaping a molten glass, or may be further ground to a mirror surface.

Methods of shaping a molten glass include dripping or flowing melted glass out of a flow pipe, receiving the melt in a receiving mold via a gas, and molding it to a desired shape such as a sphere or oblate sphere.

When the melt is dripped, a 0.1–5 dPa·s melt is adjusted to a viscosity permitting dripping, and the melt is dripped to obtain a spherical or elliptical preform. The glass that is dripped may be solidified while falling, or may be floated on a gas flow and solidified while being rotated.

When the melt is flowed, a 0.1–5 dPa·s melt is adjusted to a viscosity suited to flowing and made to flow out of a flow pipe. The glass flowed out is severed and received in a mold via a gas, and the glass is molded into a sphere or oblate sphere and solidified. The glass that is made to flow down is preferably severed without use of a cutting blade. For example, after glass that has been made to flow down by such a method has been received in the receiving mold, the receiving mold can be lowered to sever the glass.

The viscosity of the glass that is made to drip or flow from a pipe in the course of molding by dripping or flowing glass into a preform is preferably not less than 5 dPa·s. Further, the viscosity of dripping glass is more preferably 3–30 dPa·s, and the viscosity of flowing glass is more preferably 5–60 dPa·s.

At that time, to increase the viscosity of the 0.1–5 dPa·s melt to higher than 5 dPa·s, the temperature within the pipe through which the melt flows is made 1,000–800° C., or more preferably, the temperature of the front end of the flow pipe is decreased to 900–800° C. At that time, in conventional optical glass with a liquidus temperature exceeding 900° C., the viscosity is quite low when the temperature at the front end of the pipe exceeds 900° C. and the glass does not mold, causing the preform to crystallize. Thus, even when the melt has been received in the mold, improper deformation and striae result.

By contrast, the optical glass of the present invention has a low liquidus temperature of not greater than 900° C., and since a stable glass state is maintained even at a viscosity suited to preform molding, the preform does not crystallize even when heat molded by a method such as that set forth above and striae and improper deformation do not occur.

[Isothermal Pressing]

Figure 1:
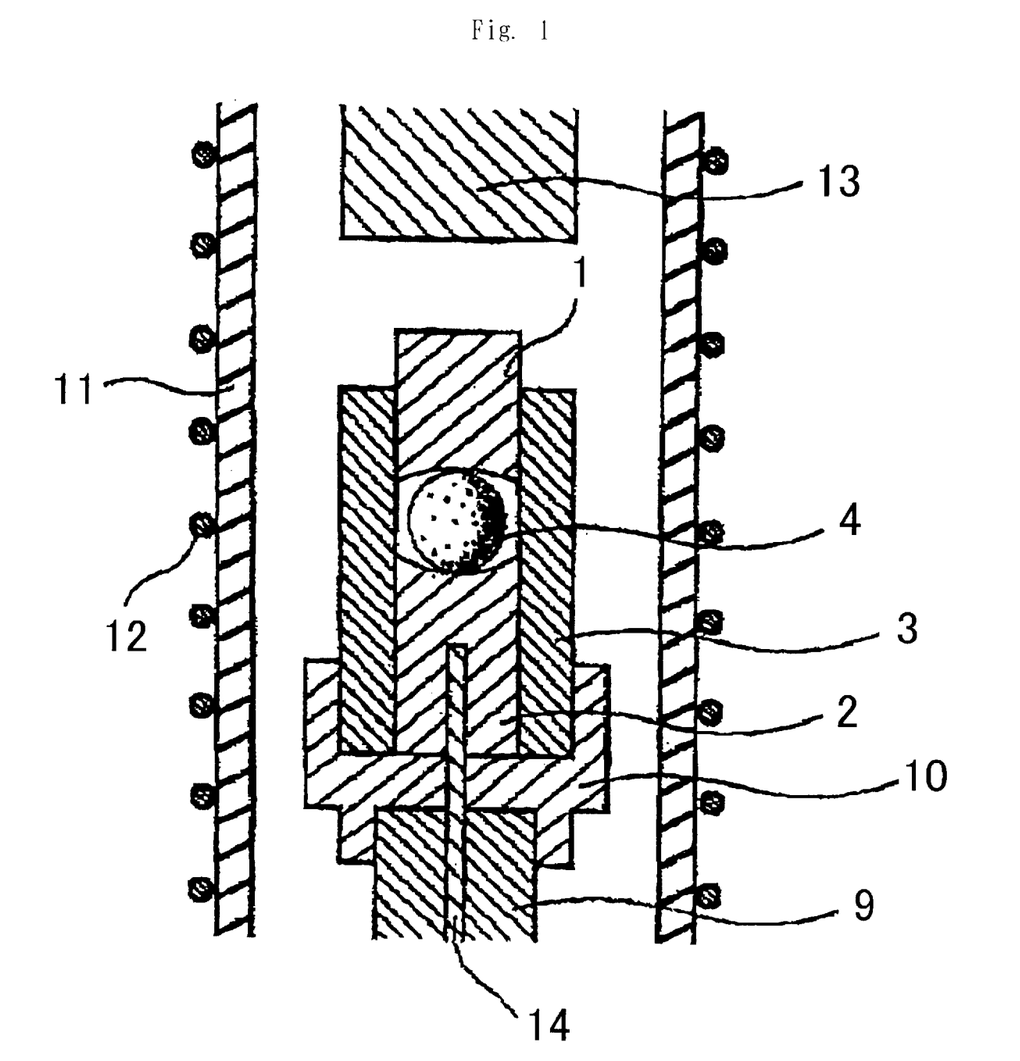
FIG. 1 is a cross-sectional view of a schematic of an example of a precision press-molding device.

FIG. 1 is a cross-sectional schematic view of an example of a precision press-molding device. In the device of FIG. 1, a mold comprising an upper mold 1, a lower mold 2, and a guide mold 3 is positioned on a support base 10 provided on a support rod 9. This assembly is positioned within a quartz tube 11 around which is coiled a heater 12. The molded glass preform 4 of the medium to high refractive index high dispersion optical glass of the present invention may be in the form of a sphere or elliptical sphere about 0.5–50 mm in diameter. The size of the spherical or elliptical preform is suitably determined in consideration of the size of the final article.

After positioning molded glass preform 4 between lower mold 2 and upper mold 1, power is supplied to heater 12 to heat the interior of quartz tube 11. The temperature within the mold is controlled by a thermocouple 14 inserted into lower mold 2. The heating temperature is set to a temperature at which molded glass preform 4 assumes a viscosity suited to precision pressing, for example, a viscosity of $10^7$–$10^8$ dPa·s. Once a prescribed temperature is reached, pressure rod 13 is dropped, pressing upper mold 1 from above and pressing glass preform 4 to be molded within the mold. The pressure in the press and time are suitably determined in consideration of the glass viscosity and the like. For example, the pressure may fall within a range of about 5–15 MPa and the time within a range of 10–300 seconds. After pressing, the glass is gradually cooled to the glass transition temperature, and then rapidly cooled to room temperature. The molded article is then removed from the mold, yielding the optical article of the present invention.

[Anisothermal Pressing]

The optical glass of the present invention can be applied to press-molding methods in which press-molding is conducted with a glass preform and a mold under temperature conditions such as the following.

The glass preform is heated to a temperature corresponding to a viscosity in the glass preform of less than $10^9$ dPa·s and softened. Because the viscosity of the glass preform is less than $10^9$ dPa·s, it is possible to mold the glass material by substantially deforming it with a mold preheated to a temperature corresponding to a viscosity higher than $10^9$ dPa·s. To conduct molding at a comparatively low temperature in the mold, the glass material is softened by heating to a temperature corresponding to $10^{5.5}$–$10^{7.6}$ dPa·s. The preheating temperature of the mold is a temperature corresponding to a viscosity of $10^9$–$10^{12}$ dPa·s in the glass material. At less than the temperature corresponding to a viscosity of $10^{12}$ dPa·s, it is sometimes difficult to greatly extend the glass material and obtain a glass molded article with a thin peripheral thickness. By contrast, at a temperature corresponding to a viscosity of $10^9$ dPa·s, the molding cycle time becomes excessively long and the service life of the mold is shortened.

[Direct Pressing]

It is also possible to conduct direct pressing from melted glass gobs. Since the liquidus temperature is low, at not greater than 900° C., this method affords the advantage of permitting a wide range in the selection of the temperature conditions at which the melt is made to flow from the flow pipe and pressing temperature conditions without causing the glass to crystallize.

[Common Press-molding]

Further, the optical glass of the present invention is also suited to press-molding methods employing grinding and polishing without just precision press-molding. The following are specific examples.

When manufacturing optical articles directly from melted glass that has been stirred and homogenized, the melted glass that has been stirred and homogenized is fed through a flow pipe to the upper surface of the lower mold of the press mold and the glass is pressure molded by the lower mold and an upper mold opposing the lower mold (called direct pressing). The molded article obtained can be ground and polished as needed to obtain an optical article.

Further, the homogenized melted glass can be temporarily cooled, processed the cooled glass into a desired shape, reheated, and pressure molded by the mold. The molded article obtained in this case can then also be ground and polished as needed to obtain an optical article.

Still further, optical articles can be manufactured by grinding and polishing.

In each of the above-described molding methods, the shape of the upper mold, lower mold, and as needed, drum mold can be suitably selected to mold optical articles such as various lenses such as spherical lenses, aspherical lenses, microlenses, lens arrays, microlens arrays; prisms; and polygonal mirrors.

EXAMPLES

The present invention is described in detail below through examples. However, the present invention is in no way limited to these examples.

The physical properties of the optical glass were measured by the following methods.

(1) Refractive index (nd) and Abbé number (vd)

Measured for optical glass obtained at a gradual cooling temperature drop rate of −30° C./h.

(2) Sag temperature temperature (Ts)

Measurements were made with a thermal expansion measuring device at a temperature increase rate of 8° C./min.

(3) Liquidus temperature (LT)

The glass was maintained for 30 min in a transparency loss test furnace with a 400–1050° C. temperature gradient and the presence or absence of crystals was observed by microscopy at a magnification of 100× to determine the liquidus temperature. Loss of transparency properties near the softening point (pressing temperature) was also observed visually simultaneously during the course of liquidus temperature measurement.

Example 1–48

The optical glasses of Examples 1–48 were prepared by the usual methods according to the glass compositions indicated in Tables 1–4. That is, starting materials in the form of phosphate compounds such as phosphorus pentoxide, orthophosphoric acid, and metaphosphate were employed for $P_2O_5$. For the other compounds, carbonates, nitrates, hydroxides, oxides and the like were employed. These starting materials were weighed out to desired proportions and mixed into a proportioned starting material. This was then charged to a melting furnace heated to 1,000–1,200° C., melted, clarified, stirred, and homogenized, placed in a mold, and gradually cooled to obtain the optical glasses of Examples 1–48.

The compositions of the optical glasses obtained varied only slightly, by much less than 1 percent up or down, from the glass compositions shown in Tables 1 to 4. Thus, they can be said to have been nearly identical to the glass compositions shown in Tables 1–4.

As can be seen from the tables, each of the glasses of Examples 1–48 had a refractive index (nd) within the range of 1.64–1.72, an Abbé number (vd) within the range of 29–36, and a sag temperature (Ts) of not greater than 520° C. Further, none of the liquidus temperatures were greater than 900° C. No unmelted matter, loss of transparency, residual bubbles, striae, or coloration was observed in any of the glasses of the examples.

As will be understood from these results, each of the glasses of the examples was suited to press-molding, particularly precision press-molding.

TABLE 1

| | Glass composition (wt %) | | | | | | | | | | | | |
|---|---|---|---|---|---|---|---|---|---|---|---|---|---|
| | P2O5 | SiO2 | Al2O3 | Na2O | K2O | TiO2 | Nb2O5 | ZnO | Li2O | B2O3 | BaO | WO3 | Sb2O3 |
| 1 | 34.6 | 0.3 | 0.0 | 9.9 | 1.5 | 3.5 | 29.8 | 0.0 | 3.0 | 2.0 | 11.3 | 4.0 | 0.1 |
| 2 | 32.3 | 0.0 | 0.0 | 5.9 | 13.3 | 1.5 | 25.8 | 4.0 | 1.0 | 2.8 | 4.3 | 9.0 | 0.1 |
| 3 | 33.3 | 0.0 | 2.0 | 7.9 | 6.5 | 0.0 | 20.8 | 14.5 | 3.0 | 3.1 | 1.3 | 7.5 | 0.1 |
| 4 | 36.4 | 0.0 | 0.0 | 8.9 | 3.5 | 0.0 | 23.3 | 5.5 | 2.0 | 0.5 | 0.0 | 19.8 | 0.1 |
| 5 | 33.6 | 0.0 | 0.0 | 15.9 | 0.0 | 1.5 | 8.8 | 0.0 | 2.0 | 3.6 | 0.0 | 34.5 | 0.1 |
| 6 | 32.3 | 0.0 | 0.0 | 9.9 | 8.5 | 4.4 | 25.8 | 0.0 | 5.0 | 2.8 | 0.0 | 11.3 | 0.0 |
| 7 | 33.5 | 0.0 | 0.0 | 21.4 | 0.0 | 3.5 | 23.6 | 6.3 | 2.0 | 1.8 | 0.0 | 7.8 | 0.1 |
| 8 | 34.3 | 2.0 | 1.8 | 16.4 | 0.0 | 3.5 | 26.6 | 4.3 | 3.0 | 2.0 | 0.0 | 6.0 | 0.1 |
| 9 | 33.0 | 0.5 | 0.3 | 17.4 | 1.0 | 7.0 | 25.6 | 4.3 | 3.0 | 2.8 | 0.0 | 5.0 | 0.1 |
| 10 | 33.5 | 0.0 | 3.0 | 12.4 | 0.0 | 3.9 | 20.0 | 4.9 | 2.5 | 9.4 | 0.8 | 9.5 | 0.1 |
| 11 | 41.0 | 0.0 | 3.5 | 12.4 | 0.0 | 3.9 | 15.0 | 4.9 | 2.5 | 6.5 | 0.8 | 9.5 | 0.0 |
| 12 | 44.9 | 0.3 | 1.0 | 10.4 | 0.5 | 4.5 | 22.2 | 4.3 | 3.0 | 7.8 | 1.0 | 0.0 | 0.1 |

TABLE 1-continued

| | | | | | | | | | | | | |
|---|---|---|---|---|---|---|---|---|---|---|---|---|
| 13 | 36.4 | 0.0 | 0.0 | 10.9 | 3.5 | 0.8 | 23.3 | 5.5 | 2.0 | 2.5 | 0.0 | 15.0 | 0.1 |

| | Glass composition (wt %) | | | | Properties | | | | |
|---|---|---|---|---|---|---|---|---|---|
| | Total | Total 1 | Total 2 | Na2O + K2O | nd | vd | Tg (° C.) | Ts (° C.) | LT (° C.) | TL |
| 1 | 100.0 | 84.8 | 100.0 | 11.4 | 1.7151 | 30.7 | 470 | 512 | 890 | TP |
| 2 | 100.0 | 90.1 | 100.0 | 19.2 | 1.6840 | 32.8 | 455 | 515 | 780 | TP |
| 3 | 100.0 | 82.1 | 100.0 | 14.4 | 1.6731 | 35.2 | 413 | 449 | 780 | TP |
| 4 | 100.0 | 94.4 | 100.0 | 12.4 | 1.6844 | 33.3 | 460 | 490 | 870 | TP |
| 5 | 100.0 | 98.4 | 100.0 | 15.9 | 1.6524 | 35.6 | 445 | 480 | 850 | TP |
| 6 | 100.0 | 95.6 | 100.0 | 18.4 | 1.6877 | 30.9 | 410 | 450 | 880 | TP |
| 7 | 100.0 | 90.1 | 100.0 | 21.4 | 1.6658 | 32.9 | 420 | 458 | 820 | TP |
| 8 | 100.0 | 88.3 | 100.0 | 16.4 | 1.6862 | 31.6 | 470 | 515 | 800 | TP |
| 9 | 100.0 | 87.8 | 100.0 | 18.4 | 1.7013 | 29.6 | 465 | 500 | 780 | TP |
| 10 | 100.0 | 87.3 | 100.0 | 12.4 | 1.6721 | 32.9 | 460 | 505 | 800 | TP |
| 11 | 100.0 | 86.9 | 100.0 | 12.4 | 1.6471 | 34.9 | 450 | 490 | 780 | TP |
| 12 | 100.0 | 88.8 | 100.0 | 10.9 | 1.6447 | 34.6 | 480 | 520 | 860 | TP |
| 13 | 100.0 | 93.6 | 100.0 | 14.4 | 1.6704 | 34.3 | 450 | 480 | 830 | TP |

Total 1: P2O5 + Li2O + Na2O + K2O + Nb2O5 + B2O3 + WO3
Total 2: P2O5 + Li2O + Na2O + Nb2O5 + B2O3 + WO3 + SiO2 + Al2O3 + K2O + TiO2 + ZnO + BaO + Sb2O3 + SnO2
TL (Transparency loss): Loss of transparency at around pressing temperature (TP = transparent)

TABLE 2

| | Glass Composition (wt %) | | | | | | | | | | |
|---|---|---|---|---|---|---|---|---|---|---|---|
| | P2O5 | Al2O3 | Na2O | TiO2 | Nb2O5 | ZnO | Li2O | B2O3 | WO3 | | Sb2O3 |
| 14 | 34.0 | 1.5 | 15.5 | 4.0 | 23.1 | 3.5 | 2.5 | 2.5 | 11.5 | MgO 1.8 | 0.1 |
| 15 | 34.0 | 1.5 | 15.5 | 4.0 | 23.1 | 3.5 | 2.5 | 2.5 | 11.5 | CaO 1.8 | 0.1 |
| 16 | 34.0 | 1.5 | 15.5 | 4.0 | 23.1 | 3.5 | 2.5 | 2.5 | 11.5 | SrO 1.8 | 0.1 |
| 17 | 34.0 | 1.5 | 15.5 | 4.0 | 23.1 | 3.5 | 2.5 | 2.5 | 11.5 | La2O3 1.8 | As2O3 0.1 |
| 18 | 34.0 | 1.5 | 15.5 | 4.0 | 23.1 | 3.5 | 2.5 | 2.5 | 11.5 | Y2O3 1.8 | 0.1 |
| 19 | 34.0 | 1.5 | 15.5 | 4.0 | 23.1 | 3.5 | 2.5 | 2.5 | 11.5 | Gd2O3 1.8 | SnO2 0.1 |
| 20 | 34.0 | 1.5 | 15.5 | 4.0 | 23.1 | 3.5 | 2.5 | 2.5 | 11.5 | ZrO2 1.8 | 0.1 |
| 21 | 34.0 | 1.5 | 15.5 | 4.0 | 23.1 | 3.5 | 2.5 | 2.5 | 11.5 | Ta2O5 1.8 | 0.1 |
| 22 | 34.0 | 1.5 | 15.5 | 4.0 | 23.1 | 3.5 | 2.5 | 2.5 | 11.5 | In2O3 1.8 | 0.1 |
| 23 | 34.0 | 1.5 | 15.5 | 4.0 | 23.1 | 3.5 | 2.5 | 2.5 | 11.5 | TeO2 1.8 | 0.1 |
| 24 | 34.0 | 1.5 | 15.5 | 4.0 | 23.1 | 3.5 | 2.5 | 2.5 | 11.5 | Bi2O3 1.8 | 0.1 |

| | Glass Composition (wt %) | | | | Properties | | | | |
|---|---|---|---|---|---|---|---|---|---|
| | Total | Total 1 | Total 2 | Na2O + K2O | nd | vd | Tg (° C.) | Ts (° C.) | LT (° C.) | TL |
| 14 | 98.2 | 89.1 | 98.2 | 15.5 | 1.6880 | 31.3 | 455 | 500 | 820 | TP |
| 15 | 98.2 | 89.1 | 98.2 | 15.5 | 1.6882 | 31.3 | 455 | 500 | 800 | TP |
| 16 | 98.2 | 89.1 | 98.2 | 15.5 | 1.6882 | 31.3 | 460 | 505 | 810 | TP |
| 17 | 98.1 | 89.1 | 98.1 | 15.5 | 1.6912 | 31.0 | 460 | 505 | 850 | TP |
| 18 | 98.2 | 89.1 | 98.2 | 15.5 | 1.6911 | 31.0 | 460 | 505 | 850 | TP |
| 19 | 98.1 | 89.1 | 98.1 | 15.5 | 1.6910 | 31.0 | 460 | 505 | 845 | TP |
| 20 | 98.2 | 89.1 | 98.2 | 15.5 | 1.6921 | 30.9 | 465 | 510 | 880 | TP |
| 21 | 98.2 | 89.1 | 98.2 | 15.5 | 1.6933 | 30.8 | 465 | 510 | 880 | TP |
| 22 | 98.2 | 89.1 | 98.2 | 15.5 | 1.6931 | 30.6 | 455 | 500 | 840 | TP |
| 23 | 98.2 | 89.1 | 98.2 | 15.5 | 1.6932 | 30.7 | 450 | 495 | 800 | TP |
| 24 | 98.2 | 89.1 | 98.2 | 15.5 | 1.6942 | 30.5 | 450 | 495 | 820 | TP |

Total 1: P2O5 + Li2O + Na2O + K2O + Nb2O5 + B2O3 + WO3
Total 2: P2O5 + Li2O + Na2O + Nb2O5 + B2O3 + WO3 + SiO2 + Al2O3 + K2O + TiO2 + ZnO + BaO + Sb2O3 + SnO2
TL (Transparency loss): Loss of transparency at around pressing temperature (TP = transparent)

TABLE 3

| | Glass composition (wt %) | | | | | | | | | | | | |
|---|---|---|---|---|---|---|---|---|---|---|---|---|---|
| | P2O5 | SiO2 | Al2O3 | Na2O | K2O | TiO2 | Nb2O5 | ZnO | Li2O | B2O3 | BaO | WO3 | Sb2O3 |
| 25 | 32.3 | 0.0 | 0.0 | 10.5 | 7.0 | 2.5 | 27.0 | 4.0 | 1.5 | 1.8 | 4.3 | 9.0 | 0.1 |
| 26 | 34.3 | 0.9 | 2.8 | 16.0 | 0.0 | 3.5 | 26.6 | 4.3 | 3.5 | 2.0 | 0.0 | 6.0 | 0.1 |
| 27 | 36.4 | 0.0 | 1.0 | 10.9 | 1.5 | 2.0 | 24.6 | 5.5 | 2.0 | 1.2 | 0.0 | 14.8 | 0.1 |
| 28 | 39.5 | 0.3 | 1.0 | 12.5 | 0.0 | 5.5 | 25.2 | 4.3 | 3.0 | 4.6 | 1.0 | 3.0 | 0.1 |

TABLE 3-continued

| | | | | | | | | | | | | |
|---|---|---|---|---|---|---|---|---|---|---|---|---|
| 29 | 34.3 | 0.0 | 1.8 | 18.4 | 0.0 | 3.5 | 26.6 | 4.3 | 3.0 | 2.0 | 0.0 | 6.0 | 0.1 |
| 30 | 35.8 | 0.0 | 1.5 | 11.2 | 4.5 | 3.0 | 10.8 | 9.0 | 3.0 | 3.1 | 0.5 | 17.5 | 0.1 |
| 31 | 33.3 | 0.5 | 2.0 | 11.9 | 3.5 | 3.5 | 19.8 | 7.0 | 3.0 | 3.1 | 1.3 | 10.5 | 0.6 |
| 32 | 32.3 | 0.0 | 0.0 | 15.9 | 4.5 | 4.4 | 25.8 | 0.0 | 3.0 | 2.8 | 0.0 | 11.3 | 0.0 |
| 33 | 35.4 | 0.0 | 0.0 | 11.5 | 2.5 | 0.0 | 25.3 | 5.5 | 2.0 | 2.0 | 2.9 | 12.8 | 0.1 |
| 34 | 36.5 | 0.0 | 2.5 | 13.9 | 3.0 | 3.9 | 15.0 | 4.9 | 2.5 | 4.5 | 3.8 | 9.5 | 0.0 |
| 35 | 38.9 | 0.3 | 1.0 | 15.4 | 0.5 | 5.5 | 26.2 | 4.3 | 3.0 | 3.8 | 1.0 | 0.0 | 0.1 |

| | Glass composition (wt %) | | | | Properties | | | | | |
|---|---|---|---|---|---|---|---|---|---|---|
| | Total | Total 1 | Total 2 | Na2O + K2O | nd | vd | Tg (° C.) | Ts (° C.) | LT (° C.) | TL |
| 25 | 100.0 | 89.1 | 100.0 | 17.5 | 1.7051 | 32.0 | 455 | 500 | 850 | TP |
| 26 | 100.0 | 88.4 | 100.0 | 16 | 1.6863 | 31.6 | 460 | 495 | 780 | TP |
| 27 | 100.0 | 91.4 | 100.0 | 12.4 | 1.6864 | 33.2 | 475 | 510 | 860 | TP |
| 28 | 100.0 | 87.8 | 100.0 | 12.5 | 1.6887 | 31.4 | 470 | 510 | 840 | TP |
| 29 | 100.0 | 90.3 | 100.0 | 18.4 | 1.6852 | 31.6 | 440 | 475 | 840 | TP |
| 30 | 100.0 | 85.9 | 100.0 | 15.7 | 1.6611 | 35.0 | 410 | 450 | 850 | TP |
| 31 | 100.0 | 85.1 | 100.0 | 15.4 | 1.6851 | 34.3 | 430 | 470 | 850 | TP |
| 32 | 100.0 | 95.6 | 100.0 | 20.4 | 1.6877 | 30.9 | 420 | 460 | 780 | TP |
| 33 | 100.0 | 91.5 | 100.0 | 14 | 1.6814 | 33.8 | 450 | 480 | 850 | TP |
| 34 | 100.0 | 84.9 | 100.0 | 16.9 | 1.6771 | 32.9 | 460 | 500 | 780 | TP |
| 35 | 100.0 | 87.8 | 100.0 | 15.9 | 1.6807 | 32.0 | 460 | 500 | 830 | TP |

Total 1: P2O5 + Li2O + Na2O + K2O + Nb2O5 + B2O3 + WO3
Total 2: P2O5 + Li2O + Na2O + Nb2O5 + B2O3 + WO3 + SiO2 + Al2O3 + K2O + TiO2 + ZnO + BaO + Sb2O3 + SnO2
TL (Transparency loss): Loss of transparency at around pressing temperature (TP = transparent)

TABLE 4

| | Glass composition (wt %) | | | | | | | | | | | | |
|---|---|---|---|---|---|---|---|---|---|---|---|---|---|
| | P2O5 | SiO2 | Al2O3 | Na2O | K2O | TiO2 | Nb2O5 | ZnO | Li2O | B2O3 | BaO | WO3 | Sb2O3 |
| 36 | 34.7 | 0.0 | 1.5 | 15.8 | 0.0 | 4.1 | 23.5 | 3.6 | 2.5 | 2.5 | 0.0 | 11.7 | 0.1 |
| 37 | 32.5 | 0.0 | 1.5 | 15.8 | 0.0 | 3.9 | 23.9 | 3.6 | 2.5 | 4.7 | 0.0 | 11.5 | 0.1 |
| 38 | 37.8 | 0.0 | 1.5 | 15.0 | 0.0 | 4.1 | 21.2 | 3.0 | 2.8 | 2.5 | 0.0 | 12.0 | 0.1 |
| 39 | 39.0 | 0.0 | 1.5 | 15.8 | 0.0 | 3.7 | 22.1 | 3.6 | 2.0 | 1.0 | 0.0 | 11.2 | 0.1 |
| 40 | 34.7 | 0.0 | 0.8 | 16.8 | 0.0 | 4.1 | 23.5 | 4.8 | 1.0 | 2.5 | 0.0 | 11.7 | 0.1 |
| 41 | 34.7 | 0.0 | 1.5 | 15.8 | 0.0 | 4.1 | 22.0 | 3.6 | 4.0 | 2.5 | 0.0 | 11.7 | 0.1 |
| 42 | 34.7 | 0.0 | 1.5 | 12.5 | 3.3 | 4.5 | 22.7 | 3.6 | 2.5 | 2.5 | 0.0 | 12.1 | 0.1 |
| 43 | 34.7 | 0.0 | 0.0 | 15.8 | 1.5 | 4.1 | 23.5 | 2.6 | 2.5 | 2.5 | 0.0 | 12.7 | 0.1 |
| 44 | 33.2 | 0.0 | 3.0 | 15.8 | 0.0 | 4.8 | 23.5 | 0.0 | 2.5 | 2.5 | 0.0 | 14.6 | SnO2 0.1 |
| 45 | 34.4 | 0.3 | 1.5 | 15.8 | 0.0 | 0.0 | 25.5 | 3.6 | 2.5 | 2.5 | 5.5 | 8.3 | 0.1 |
| 46 | 37.7 | 0.0 | 2.5 | 15.8 | 1.0 | 4.1 | 15.5 | 4.5 | 3.0 | 3.5 | 2.0 | 10.3 | 0.1 |
| 47 | 38.5 | 0.3 | 2.0 | 15.8 | 2.0 | 4.1 | 24.5 | 4.1 | 2.1 | 2.5 | 0.0 | 4.0 | 0.1 |
| 48 | 34.2 | 0.0 | 2.5 | 15.8 | 1.0 | 4.1 | 19.0 | 4.5 | 3.0 | 3.5 | 2.0 | 10.3 | 0.1 |

| | Glass composition (wt %) | | | | Properties | | | | | |
|---|---|---|---|---|---|---|---|---|---|---|
| | Total | Total 1 | Total 2 | Na2O + K2O | nd | vd | Tg (° C.) | Ts (° C.) | LT (° C.) | TL |
| 36 | 100.0 | 90.7 | 100.0 | 15.8 | 1.6890 | 31.3 | 460 | 500 | 800 | TP |
| 37 | 100.0 | 90.9 | 100.0 | 15.8 | 1.6880 | 31.4 | 460 | 500 | 800 | TP |
| 38 | 100.0 | 91.3 | 100.0 | 15.0 | 1.6790 | 32.1 | 455 | 495 | 750 | TP |
| 39 | 100.0 | 91.1 | 100.0 | 15.8 | 1.6990 | 30.5 | 465 | 505 | 840 | TP |
| 40 | 100.0 | 90.2 | 100.0 | 16.8 | 1.6895 | 31.2 | 470 | 510 | 820 | TP |
| 41 | 100.0 | 90.7 | 100.0 | 15.8 | 1.6840 | 32.3 | 440 | 480 | 780 | TP |
| 42 | 100.0 | 90.3 | 100.0 | 15.8 | 1.6895 | 31.2 | 450 | 495 | 780 | TP |
| 43 | 100.0 | 93.2 | 100.0 | 17.3 | 1.6860 | 31.5 | 450 | 490 | 760 | TP |
| 44 | 99.9 | 92.1 | 100.0 | 15.8 | 1.6920 | 31.0 | 470 | 510 | 840 | TP |
| 45 | 100.0 | 89.0 | 100.0 | 15.8 | 1.6760 | 34.3 | 470 | 510 | 780 | TP |
| 46 | 100.0 | 86.8 | 100.0 | 16.8 | 1.6640 | 33.3 | 440 | 480 | 800 | TP |
| 47 | 100.0 | 89.4 | 100.0 | 17.8 | 1.6660 | 32.7 | 460 | 500 | 820 | TP |
| 48 | 100.0 | 86.8 | 100.0 | 16.8 | 1.6840 | 31.5 | 450 | 490 | 800 | TP |

Total 1: P2O5 + Li2O + Na2O + K2O + Nb2O5 + B2O3 + WO3
Total 2: P2O5 + Li2O + Na2O + Nb2O5 + B2O3 + WO3 + SiO2 + Al2O3 + K2O + TiO2 + ZnO + BaO + Sb2O3 + SnO2
TL (Transparency loss): Loss of transparency at around pressing temperature (TP = transparent)

Example 49

Each of the glasses of Examples 1–48 was prepared in a quantity weighing about 1–3 L, the starting material was melted at a temperature (about 1,000–1,200° C.) corresponding to a viscosity of 0.1–5 dPa·s for 2–5 hr in a $SiO_2$ or Pt crucible, and the glass starting material was vitrified. The crude glasses (cullets) thus obtained were reintroduced into a 2-liter Pt melt furnace capable of forming preforms. The cullets were melted at a temperature (about 1,000–1,200° C.) corresponding to a viscosity of 0.1–5 dPa·s, debubbled, and clarified for 2–5 hr. After confirming during clarification that no bubbles were present in the glass, the glass was cooled to a temperature permitting molding of the glass (viscosity 5–30 dPa·s, temperature 1,000–800° C.) in a melt furnace and a flow pipe (the top portion of the pipe near the melt furnace had an inner diameter of 15 mm, an inner diameter of 1.5 mm at the front end, and a total length of about 2 m). After decreasing the temperature and having achieved a prescribed viscosity, the glass was made to flow out of the flow pipe and received in a mold while being floated on an $N_2$ gas flow. This yielded preforms (material for precision press-molding) in the form of spheres or elliptical spheres 0.5–50 mm in diameter. The preforms obtained were uniform in both shape and weight.

The preform was placed between upper mold 1 and lower mold 2 shown in FIG. 1, a nitrogen atmosphere was generated within quartz tube 11, and power was supplied to a heater 12 to heat the interior of quartz tube 11. The temperature within the mold was adjusted to yield a viscosity in the molded glass gob of about $10^7$–$10^8$ dPa·s. While maintaining this temperature, push rod 13 was dropped to press upper mold 1 down from above, thereby pressing the molded glass gob within the mold. The pressure applied was 8 MPa and the pressing time was 30 sec. Following pressing, the pressure was released, the glass molded product molded by the aspherical press was gradually cooled to the glass transition temperature while still in a state of contact with upper mold 1 and lower mold 2, the glass molded product was rapidly cooled to close to room temperature, and the glass molded by the aspherical surface was removed from the mold. The aspherical lens obtained did not lose transparency during pressing and was a lens of extremely high precision.

Comparative Examples 1–22

The glasses described in the examples of Japanese Patent Un-examined Publication No. Hei 07-97234 (Comparative Examples 1–9), the glasses described in the examples of Japanese Patent Un-examined Publication No. 05-270853 (Comparative Examples 10–11), the glasses described in the examples of Japanese Patent Un-examined Publication No. Shō 52-132012 (Comparative Examples 12–22) were prepared and the refractive index (nd) Abbé number (vd), sag temperature (Ts), and liquidus temperature (LT) were measured. The loss of transparency property was observed. The results are given in Tables 5–7.

TABLE 5

| | Glass composition (wt %) | | | | | | | | | | |
|---|---|---|---|---|---|---|---|---|---|---|---|
| | P2O5 | Na2O | K2O | TiO2 | Nb2O5 | Li2O | B2O3 | BaO | WO3 | | |
| 1 | 24.4 | 10 | 3.8 | 2 | 9.1 | 0 | 2.5 | 5 | | 35.2 | GeO2 8 |
| 2 | 17.4 | 10 | 0.8 | 5 | 7.6 | 0 | 12.5 | 5 | | 33.7 | GeO2 8 |
| 3 | 19.4 | 20 | 2.8 | 6 | 16.6 | 0 | 2.5 | 3 | | 25.7 | GeO2 4 |
| 4 | 19.4 | 20 | 2.8 | 6 | 16.6 | 0 | 2.5 | 3 | | 25.7 | |
| 5 | 15.4 | 10 | 12.8 | 6 | 12.6 | 0 | 5.5 | 3 | | 30.7 | GeO2 4 |
| 6 | 15.4 | 10 | 12.8 | 6 | 12.6 | 0 | 5.5 | 3 | | 30.7 | |
| 7 | 18.4 | 17 | 2.8 | 6 | 12.6 | 0 | 2.5 | 3 | | 30.7 | GeO2 4 Cs2O 3 |
| 8 | 18.4 | 17 | 2.8 | 6 | 12.6 | 0 | 2.5 | 3 | | 30.7 | Cs2O 3 |
| 9 | 23.4 | 13.5 | 2.8 | 6 | 12.6 | 0.5 | 3 | 8.7 | | 19.5 | GeO2 10 |

| | Glass composition (wt %) | | | | Properties | | | | | |
|---|---|---|---|---|---|---|---|---|---|---|
| | Total | Total 1 | Total 2 | Na2O + K2O | nd | vd | Tg (° C.) | Ts (° C.) | LT (° C.) | TL |
| 1 | 92.0 | 85.0 | 92.0 | 13.8 | 1.70266 | 32.3 | 494 | 533 | NON* | TP |
| 2 | 92.0 | 82.0 | 92.0 | 10.8 | 1.72277 | 26.5 | 479 | 529 | 850 | TP |
| 3 | 96.0 | 87.0 | 96.0 | 22.8 | 1.72361 | 34.5 | 453 | 489 | 830 | TP |
| 4 | 96.0 | 87.0 | 96.0 | 22.8 | 1.74263 | 32.8 | 448 | 476 | 980 | OP |
| 5 | 96.0 | 87.0 | 96.0 | 22.8 | 1.70035 | 29.13 | 404 | 444 | 730 | TP |
| 6 | 96.0 | 87.0 | 96.0 | 22.8 | 1.7231 | 27.8 | 400 | 435 | 950 | OP |
| 7 | 93.0 | 84.0 | 93.0 | 19.8 | 1.70815 | 31.3 | 411 | 448 | 800 | TP |
| 8 | 93.0 | 84.0 | 93.0 | 19.8 | 1.7275 | 29.8 | 405 | 444 | 970 | OP |
| 9 | 90.0 | 75.3 | 90.0 | 16.3 | 1.69121 | 30.5 | | 565 | 930 | TP |

Total 1: P2O5 + Li2O + Na2O + K2O + Nb2O5 + B2O3 + WO3
Total 2: P2O5 + Li2O + Na2O + Nb2O5 + B2O3 + WO3 + SiO2 + Al2O3 + K2O + TiO2 + ZnO + BaO + Sb2O3 + SnO2
TL (Transparency loss): Loss of transparency at around pressing temperature (TP = transparent, OP = opaque)
*Liquidus temperature was not recognized

TABLE 6

| | Glass composition (wt %) | | | | | | | | | | |
|---|---|---|---|---|---|---|---|---|---|---|---|
| | P2O5 | SiO2 | Al2O3 | Na2O | K2O | TiO2 | Nb2O5 | Li2O | B2O3 | WO3 | |
| 10 | 20 | 1 | 3 | 5 | 25 | 10 | 20 | 0.8 | 10 | 5 | As2O3 0.2 |
| 11 | 30 | 4 | 0 | 5 | 20 | 5 | 30 | 0 | 2 | 0 | CaO 3.9 |

| | Glass composition (wt %) | | | | Properties | | | | |
|---|---|---|---|---|---|---|---|---|---|
| | Sb2O3 | Total | Total 1 | Total 2 | Na2O + K2O | nd | vd | Ts (° C.) | LT (° C.) | TL |
| 10 | 0 | 99.8 | 85.8 | 99.8 | 30 | 1.65077 | 33.1 | 525 | 995 | TP |
| 11 | 0.1 | 96.1 | 87.0 | 96.1 | 25 | 1.68704 | 29.1 | 550 | 975 | OP |

Total 1: P2O5 + Li2O + Na2O + K2O + Nb2O5 + B2O3 + WO3
Total 2: P2O5 + Li2O + Na2O + Nb2O5 + B2O3 + WO3 + SiO2 + Al2O3 + K2O + TiO2 + ZnO + BaO + Sb2O3 + SnO2
TL (Transparency loss): Loss of transparency at around pressing temperature (TP = transparent, OP = opaque)

TABLE 7

| | Glass composition (wt %) | | | | | | | | | | | |
|---|---|---|---|---|---|---|---|---|---|---|---|---|
| | P2O5 | Na2O | K2O | TiO2 | Nb2O5 | ZnO | Li2O | B2O3 | | | | Sb2O3 |
| 12 | 44.37 | 0 | 0 | 0 | 31.15 | 0 | 0 | 24.48 | | | | |
| 13 | 28.09 | 1.37 | 11.8 | 0 | 43.69 | 0 | 1.14 | 13.87 | | | | |
| 14 | 28.57 | 0 | 10.6 | 0 | 44.43 | 0 | 2.27 | 14.1 | | | | |
| 15 | 27.62 | 2.73 | 13.1 | 0 | 42.96 | 0 | 0 | 13.64 | | | | |
| 16 | 27.24 | 0 | 17 | 0 | 42.36 | 0 | 0 | 13.44 | | | | |
| 17 | 30.04 | 0 | 9 | 0 | 23.73 | 2.38 | 0 | 8.07 | MgO 1.99 | CaO 2.78 | SrO 6.55 | PbO 14.51 |
| 18 | 33.64 | 0 | 11.4 | 0 | 23.95 | 4.4 | 0 | 10.45 | MgO 3.63 | CaO 5.06 | SrO 7.47 | |
| 19 | 34.2 | 0 | 6.84 | 0 | 34.62 | 0 | 0 | 10.32 | MgO 6.7 | CaO 7.32 | | |
| 20 | 35 | 0 | 7 | 0 | 33.03 | 0 | 0 | 9.3 | MgO 7.41 | CaO 8.26 | | |
| 21 | 29.76 | 0 | 13.2 | 0 | 41.15 | 0 | 0 | 8.98 | MgO 2.81 | CaO 4.06 | | |
| 22 | 26.8 | 0 | 13 | 1.47 | 23.84 | 0 | 0 | 2.87 | GeO2 18.83 | PbO 13.16 | | |

| | Glass composition (wt %) | | | | Properties | | | | |
|---|---|---|---|---|---|---|---|---|---|
| | Total | Total 1 | Total 2 | Na2O + K2O | nd | vd | Ts (° C.) | LT (° C.) | TL |
| 12 | 100.00 | 100.00 | 100.00 | 0 | 1.6549 | 36.6 | 550 | 940 | OP |
| 13 | 100.00 | 100.00 | 100.00 | 13.21 | 1.7178 | 28.4 | 550 | 950 | OP |
| 14 | 100.00 | 100.00 | 100.00 | 10.63 | 1.727 | 27.7 | 540 | 970 | OP |
| 15 | 100.00 | 100.00 | 100.00 | 15.78 | 1.7086 | 29 | 550 | 960 | OP |
| 16 | 100.00 | 100.00 | 100.00 | 16.96 | 1.6988 | 29.1 | 540 | 990 | OP |
| 17 | 73.22 | 70.84 | 73.22 | 9 | 1.7178 | 36.9 | 570 | 960 | OP |
| 18 | 83.85 | 79.45 | 83.85 | 11.41 | 1.6538 | 38.7 | 560 | 950 | OP |
| 19 | 85.98 | 85.98 | 85.98 | 6.84 | 1.7009 | 32.5 | 580 | 980 | OP |
| 20 | 84.33 | 84.33 | 84.33 | 7 | 1.6946 | 33.6 | 580 | 960 | OP |
| 21 | 93.13 | 93.13 | 93.13 | 13.24 | 1.7174 | 29.5 | 560 | 970 | OP |
| 22 | 68.02 | 66.55 | 68.02 | 13.04 | 1.7262 | 34.2 | 530 | 860 | OP |

Total 1: P2O5 + Li2O + Na2O + K2O + Nb2O5 + B2O3 + WO3
Total 2: P2O5 + Li2O + Na2O + Nb2O5 + B2O3 + WO3 + SiO2 + Al2O3 + K2O + TiO2 + ZnO + BaO + Sb2O3 + SnO2
TL (Transparency loss): Loss of transparency at around pressing temperature (OP = opaque)

The glasses described in the examples of Japanese Patent Un-examined Publication No. Hei 07-97234 (Comparative Examples 1–9)(Table 5) had refractive indexes of not more than 1.73, often resulting in characteristics whereby the sag temperature Ts exceeded 520° C. This was attributed to an $Li_2O$ content of 0–0.5 weight percent. Although there were some examples (Comparative Examples 3, 5, 7) which had a Ts of less than 520° C. despite an $Li_2O$ content falling within the range of 0–0.5 weight percent, those examples were problematic in that expensive $GeO_2$ was employed as a glass starting material. When the $GeO_2$ was removed from the glasses of these examples (Comparative Examples 4, 6, 8), there was a problem in that the liquidus temperature (LT) exceeded 900° C.

The glasses described in the examples of Japanese Patent Un-examined Publication No. 05-270853 (Comparative Examples 10–11) (Table 6) had refractive indexes of 1.64–1.73. All of them had liquidus temperatures exceeding 900° C. The Ts of these glasses also exceeded 520° C.

The glasses described in the examples of Japanese Patent Un-examined Publication No. Shō 52-132012 (Comparative Examples 12–22) (Table 7) had refractive indexes of 1.64–1.73 and a Ts exceeding 520° C. Further, excluding the glasses described in Examples 2 and 3 (Comparative Examples 13 and 14), the fact that $Li_2O$ was not incorporated was thought to be one cause of the Ts exceeding 520°. Even in the glasses of Examples 2 and 3 (Comparative Examples 13 and 14) where $Li_2O$ was incorporated in a quantity exceeding 0.5 weight percent, the Ts exceeded 520° C. and the liquidus temperature exceeded 900° C.

As set forth above, according to the present invention, it is possible to obtain optical glass having both a low refractive index and liquidus temperature while not exhibiting crystallization, bubble retention, striae, coloration, or improper deformation. Accordingly, the use of this glass permits precision press-molding at relatively low temperature and prevents fusion of the glass with the mold during pressing. Further, since a high thermal load is not exerted on the press machine, there is no risk of product damage due to heat.

The optical glass of the present invention has good resistance to loss of transparency due to having a liquidus temperature of not greater than 900° C. and affords good press-molding characteristics with heating in the relatively low temperature range due to having a sag temperature of not greater than 520° C. Thus, the molding temperature can be 540° C. or less. Further, the stability of the glass during press-molding is good.

Due to the low liquidus temperature, resistance to loss of transparency is good and glass crystallization is prevented both during the molding of molten glass into material for use in precision press-molding and during heating as part of press-molding. Still further, it is possible to obtain high-quality optical glass in which bubbles generated during glass melting do not remain in the glass and which does not exhibit striae, coloration, or improper deformation.

The present disclosure relates to the subject matter contained in Japanese Patent Application No. 2001-19854 filed on Jan. 29, 2001, which is expressly incorporated herein by reference in its entirety.

What is claimed is:

1. A press-molding glass preform comprised of an optical glass comprising, by means of weight percentages, more than 32 percent and not more than 45 percent $P_2O_5$, more than 0.5 percent and not more than 6 percent $Li_2O$, more than 5 percent and not more than 22 percent $Na_2O$, 6–30 percent $Nb_2O_5$, 0.5–10 percent $B_2O_3$, 0–35 percent $WO_3$, 0–14 percent $K_2O$, and 10–24 percent $Na_2O+K_2O$, wherein the sum of the oxides of P, Li, Na, Nb, B, W, and K is not less than 80 percent, and wherein the optical glass does not comprise PbO.

2. The press-molding glass preform of claim 1, wherein the glass comprises, by means of weight percentages, more than 32 percent and not more than 40 percent $P_2O_5$, 1–4 percent $Li_2O$, 10–19 percent $Na_2O$, 10–28 percent $Nb_2O_5$, 1–5 percent $B_2O_3$, 0–8 percent $K_2O$, and 12–22 percent $Na_2O+K_2O$, and wherein the sum of the oxides of P, Li, Na, Nb, B, and K is not less than 80 percent.

3. The press-molding glass preform of claim 2, wherein the glass comprises 12–17 percent $Na_2O$, 15–26 percent $Nb_2O_5$, 0–4 percent $K_2O$, and 14–19 percent $Na_2O+K_2O$.

4. The press-molding glass preform of claim 1, wherein the glass further comprises, by means of weight percentages, 0–2 percent $SiO_2$, 0–5 percent $Al_2O_3$, from 0 percent to less than 8 percent $TiO_2$, 0–15 percent ZnO, 0–12 percent BaO, 0–18 percent $WO_3$, from 0 percent to less than 1 percent $Sb_2O_3$, and 0–1 percent $SnO_2$, and wherein the sum of all of the oxides of P, Li, Na, Nb, B, W, K, Si, Al, Ti, Zn, Ba, Sb, and Sn is not less than 95 percent.

5. The press-molding glass preform of claim 1, wherein the glass comprises, by means of weight percentages, 0–3 percent $Al_2O_3$, 0–6 percent $TiO_2$, and 0–9 percent ZnO, where the sum of the oxides of P, Li, Na, Nb, B, W, K, Al, Ti, and Zn is not less than 95 weight percent.

6. The press-molding glass preform of claim 4, wherein the glass comprises 0–1 percent $SiO_2$.

7. The press-molding glass preform of claim 1, wherein the glass comprises from 0 percent to less than 0.5 percent $SiO_2$, 0–5 percent $TiO_2$, 0–5 percent ZnO, and wherein the sum of the oxides of P, Li, Na, Nb, B, W, K, Si, Ti, and Zn is not less than 98 percent.

8. The press-molding glass preform of claim 1, wherein the glass further comprises 3–15 weight percent $WO_3$ and does not comprise $GeO_2$.

9. A press-molding glass preform comprised of an optical glass comprised of phosphate glass which comprises, by means of weight percentages, more than 0.5 percent and but not more than 6 percent $Li_2O$, more than 5 percent but not more than 22 percent $Na_2O$, 0–14 percent $K_2O$, 10–24 percent $Na_2O+K_2O$, 6–30 percent $Nb_2O_5$, and not more than 45 percent $P_2O_5$, and exhibits a refractive index (nd) of 1.64–1.72, an Abbé number (vd) of 29–36, and a sag temperature (Ts) of not greater than 520° C. wherein the optical glass does not comprise PbO.

10. A press-molding glass preform comprised of an optical glass comprised of phosphate glass which comprises, by means of weight percentages, more than 0.5 percent but not more than 6 percent $Li_2O$, more than 5 percent but not more than 22 percent $Na_2O$, 0–14 percent $K_2O$, 10–24 percent $Na_2O+K_2O$, 6–30 percent $Nb_2O_5$, 0–35 percent $WO_3$, 0–5 percent $Al_2O_3$, and from 0 percent to less than 8 percent $TiO_2$, and exhibits a refractive index (nd) of 1.64–1.72, an Abbé number (vd) of 29–36, and an sag temperature (Ts) of not greater than 520° C., wherein the optical glass does not comprise PbO.

11. The press-molding glass preform of claim 9, wherein the glass comprises more than 32 weight percent but not more than 45 weight percent $P_2O_5$.

12. A press-molding glass preform comprised of an optical glass comprising, by means of weight percentages, more than 32 percent but not more than 45 percent $P_2O_5$, more than 0.5 percent but not more than 6 percent $Li_2O$, more than 5 percent but not more than 22 percent $Na_2O$, 6–30 percent $Nb_2O_5$, 0.5–10 percent $B_2O_3$, 0–35 percent $WO_3$, 0–14 percent $K_2O$, 10–24 percent $Na_2O+K_2O$, 0–2 percent $SiO_2$, 0–5 percent $Al_2O_3$, from 0 percent to less than 8 percent $TiO_2$, 0–15 percent ZnO, 0–12 percent BaO, from 0 percent to less than 1 percent $Sb_2O_3$, and 0–1 percent $SnO_2$, where the sum of the oxides of P, Li, Na, Nb, B, W, K, Si, Al, Ti, Zn, Ba, Sb, and Sn is not less than 95 percent, the refractive index (nd) is 1.64–1.72, the Abbé number (vd) is 29–36, and the sag temperature (Ts) is not more than 520° C. and wherein the optical glass does not comprise PbO.

13. A press-molding glass preform comprised of an optical glass comprised of phosphate glass which comprises $Li_2O$, $Na_2O$, $Nb_2O_5$, and $B_2O_3$ as essential components, and not more than 2 weight percent $SiO_2$ an optional component, with a refractive index (nd) of 1.64–1.72, an Abbé number (vd) of 29–36, a sag temperature (Ts) of not more than 520° C., and a liquidus temperature (LT) of not more than 900° C., wherein the optical glass does not comprise PbO.

14. The press-molding glass preform of claim 13, wherein the glass further comprises, by means of weight percentages, more than 32 percent but not more than 45 percent $P_2O_5$, more than 0.5 percent but not more than 6 percent $Li_2O$, more than 5 percent but not more than 22 percent $Na_2O$, 6–30 percent $Nb_2O_5$, and 0.5–10 percent $B_2O_3$.

15. The press-molding glass preform of claim 1, wherein the glass further comprises, by means of weight percentages, 0–5 percent MgO, 0–5 percent CaO, 0–5 percent SrO, 0–3 percent $La_2O_3$, 0–3 percent $Y_2O_3$, 0–3 percent $Gd_2O_3$, 0–3 percent $ZrO_2$, from 0 percent to less than 1 percent $As_2O_3$, 0–3 percent $Ta_2O_5$, 0–3 percent $In_2O_3$, 0–3 percent $TeO_2$, 0–3 percent $Bi_2O_3$, and 0–1 percent $GeO_2$, where the total sum of the oxides of P, Li, Na, Nb, B, W, K, Mg, Ca, Sr, La, Y, Gd, Zr, As, Ta, In, Te, Bi, and Ge is not less than 99 percent.

16. The press-molding glass preform of claim 9, wherein the glass further comprises, by means of weight percentages, 0–5 percent MgO, 0–5 percent CaO, 0–5 percent SrO, 0–3 percent $La_2O_3$, 0–3 percent $Y_2O_3$, 0–3 percent $Gd_2O_3$, 0–3 percent $ZrO_2$, from 0 percent to less than 1 percent $As_2O_3$, 0–3 percent $Ta_2O_5$, 0–3 percent $In_2O_3$, 0–3 percent $TeO_2$, 0–3 percent $Bi_2O_3$, and 0–1 percent $GeO_2$, where the sum of the oxides of P, Li, Na, Nb, B, W, K, Mg, Ca, Sr, La, Y, Gd, Zr, As, Ta, In, Te, Bi, and Ge is not less than 99 percent.

17. The press-molding glass preform of claim 10, wherein the glass further comprises, by means of weight percentages, 0–5 percent MgO, 0–5 percent CaO, 0–5 percent SrO, 0–3 percent $La_2O_3$, 0–3 percent $Y_2O_3$, 0–3 percent $Gd_2O_3$, 0–3 percent $ZrO_2$, from 0 percent to less than 1 percent $As_2O_3$, 0–3 percent $Ta_2O_5$, 0–3 percent $In_2O_3$, 0–3 percent $TeO_2$, 0–3 percent $Bi_2O_3$, and 0–1 percent $GeO_2$, where the sum of the oxides of P, Li, Na, Nb, B, W, K, Mg, Ca, Sr, La, Y, Gd, Zr, As, Ta, In, Te, Bi, and Ge is not less than 99 percent.

18. The press-molding glass preform of claim 12, wherein the glass further comprises, by means of weight percentages, 0–5 percent MgO, 0–5 percent CaO, 0–5 percent SrO, 0–3 percent $La_2O_3$, 0–3 percent $Y_2O_3$, 0–3 percent $Gd_2O_3$, 0–3 percent $ZrO_2$, from 0 percent to less than 1 percent $As_2O_3$, 0–3 percent $Ta_2O_5$, 0–3 percent $In_2O_3$, 0–3 percent $TeO_2$, 0–3 percent $Bi_2O_3$, and 0–1 percent $GeO_2$, where the sum of the oxides of P, Li, Na, Nb, B, W, K, Mg, Ca, Sr, La, Y, Gd, Zr, As, Ta, In, Te, Bi, and Ge is not less than 99 percent.

19. A glass optical article obtained by reheat press-molding the glass preform of claim 1.

20. A glass optical article obtained by reheat press-molding the glass preform of claim 9.

21. A glass optical article obtained by reheat press-molding the glass preform of claim 10.

22. A glass optical article obtained by reheat press-molding the glass preform of claim 12.

23. A glass optical article obtained by reheat press-molding the glass preform of claim 13.

24. The press-molding glass preform of claim 9, wherein the glass further comprises 3–15 weight percent $WO_3$ and does not comprise $GeO_2$.

25. The press-molding glass preform of claim 10, wherein the glass further comprises 3–15 weight percent $WO_3$ and does not comprise $GeO_2$.

26. The press-molding glass preform of claim 12, wherein the glass further comprises 3–15 weight percent $WO_3$ and does not comprise $GeO_2$.

27. The press-molding glass preform of claim 13, wherein the glass further comprises 3–15 weight percent $WO_3$ and does not comprise $GeO_2$.

28. The press-molding glass preform of claim 5, wherein the glass comprises 0–1 percent $SiO_2$.

29. The press-molding glass preform of claim 10, wherein the glass comprises more than 32 weight percent but not more than 45 weight percent $P_2O_5$.

30. The press-molding glass preform of claim 1, wherein the preform is obtained by preforming a piece of optical glass melt while floating the piece with a gas flow.

31. The press-molding glass preform of claim 1, wherein the preform has a uniform shape and weight.

32. The press-molding glass preform of claim 9, wherein the preform is obtained by preforming a piece of optical glass melt while floating the piece with a gas flow.

33. The press-molding glass preform of claim 9, wherein the preform has a uniform shape and weight.

34. The press-molding glass preform of claim 10, wherein the preform is obtained by performing a piece of optical glass melt while floating the piece with a gas flow.

35. The press-molding glass preform of claim 10, wherein the preform has a uniform shape and weight.

36. The press-molding glass preform of claim 12, wherein the preform is obtained by preforming a piece of optical glass melt while floating the piece with a gas flow.

37. The press-molding glass preform of claim 12, wherein the preform has a uniform shape and weight.

38. The press-molding glass preform of claim 13, wherein the preform is obtained by preforming a piece of optical glass melt while floating the piece with a gas flow.

39. The press-molding glass preform of claim 13, wherein the preform has a uniform shape and weight.

40. The pres-molding glass preform of claim 12, wherein the refractive index (nd) ranges from 1.65 to 1.71.

41. The press-molding glass preform of claim 15, wherein the Abbé number (vd) ranges from 30 to 35.5.

* * * * *